(12) United States Patent
Kukura et al.

(10) Patent No.: US 12,072,287 B2
(45) Date of Patent: Aug. 27, 2024

(54) SCATTERING MICROSCOPY

(71) Applicant: Oxford University Innovation Limited, Oxford (GB)

(72) Inventors: Philipp Kukura, Oxford (GB); Sanli Faez, Oxford (GB)

(73) Assignee: OXFORD UNIVERSITY INNOVATION LIMITED, Oxford (GB)

(*) Notice: Subject to any disclaimer, the term of this patent is extended or adjusted under 35 U.S.C. 154(b) by 326 days.

(21) Appl. No.: 17/440,945

(22) PCT Filed: Mar. 12, 2020

(86) PCT No.: PCT/GB2020/050625
§ 371 (c)(1),
(2) Date: Sep. 20, 2021

(87) PCT Pub. No.: WO2020/188251
PCT Pub. Date: Sep. 24, 2020

(65) Prior Publication Data
US 2022/0221401 A1    Jul. 14, 2022

(30) Foreign Application Priority Data
Mar. 21, 2019 (GB) .................................. 1903891

(51) Int. Cl.
*G01N 21/47* (2006.01)
*G01N 21/66* (2006.01)
(Continued)

(52) U.S. Cl.
CPC ............. *G01N 21/47* (2013.01); *G01N 21/66* (2013.01); *G02B 21/002* (2013.01); *G02B 21/36* (2013.01); *G01N 21/4795* (2013.01)

(58) Field of Classification Search
CPC ............ G02B 21/0004; G02B 21/0016; G02B 21/002; G02B 21/06; G02B 21/08;
(Continued)

(56) References Cited

U.S. PATENT DOCUMENTS 4,231,660 A * 11/1980 Remy ...................... A61N 1/04
359/398
6,052,224 A * 4/2000 Richardson ............ G02B 21/34
359/398
(Continued)

FOREIGN PATENT DOCUMENTS

CN    102798735 A    11/2012
CN    108226095 A     6/2018
(Continued)

OTHER PUBLICATIONS

Ma, Guanzhong et al., "Optical imaging of single protein size, charge, mobility, binding, and conformational change," 2019, https://doi.org/10.1101/505404, pp. 1-19. (Year: 2019).*
(Continued)

*Primary Examiner* — Gordon J Stock, Jr.
(74) *Attorney, Agent, or Firm* — Thomas|Horstemeyer, LLP

(57) ABSTRACT

A scattering microscopy arrangement uses a microscope to image an object comprising a surface. A light source emits illuminating light and a light detector detects light elastically scattered from the object. An electric potential is applied to the surface that affects the electrochemical properties of the object while imaging. The electric potential provides a contrast mechanism that improves the imaging and allows for characterisation of the object and/or the surrounding environment.

19 Claims, 5 Drawing Sheets

(51) Int. Cl.
*G02B 21/00* (2006.01)
*G02B 21/36* (2006.01)

(58) Field of Classification Search
CPC ...... G02B 21/10; G02B 21/12; G02B 21/124; G02B 21/34; G02B 21/36; G01N 21/47; G01N 21/4795; G01N 21/66
See application file for complete search history.

(56) References Cited

U.S. PATENT DOCUMENTS

| | | | | |
|---|---|---|---|---|
| 7,387,715 | B2* | 6/2008 | Vogel | B01L 3/5085 |
| | | | | 204/403.01 |
| 10,189,019 | B2* | 1/2019 | Ausserre | C25D 17/02 |
| 10,775,597 | B2* | 9/2020 | Kukura | G02B 21/361 |
| 11,480,541 | B2* | 10/2022 | Tao | G01N 15/1475 |
| 11,635,431 | B2* | 4/2023 | Tao | G01N 33/557 |
| | | | | 435/288.7 |
| 2015/0204810 | A1 | 7/2015 | Pan et al. | |

FOREIGN PATENT DOCUMENTS

| | | |
|---|---|---|
| CN | 109916883 A | 6/2019 |
| EP | 3 276 389 A1 | 1/2018 |
| JP | 2008196943 A | 8/2008 |
| JP | 2013533485 A | 8/2013 |
| JP | 2018527573 A | 9/2018 |
| WO | 2018102747 A1 | 6/2018 |

OTHER PUBLICATIONS

International Search Report and Written Opinion for WO 2020/188251 (PCT/GB2020/050625), dated Jun. 12, 2020, pp. 1-16.
UK Search Report for GB 1903891.8, dated Sep. 6, 2019, pp. 1-4.
Chao Jing et al: "Review Article Nanoscale electrochemistry in the dark-field", Current Opinion in Electrochemistry, vol. 6, No. 1, Jul. 5, 2017 (Jul. 5, 2017), pp. 10-16.
Ramos R et al: "Near-field artifacts in tip-enhanced Raman spectroscopy", Applied Physics Letters, A I P Publishing LLC, US, vol. 100, No. 21, May 21, 2012 (May 21, 2012), pp. 213111-213111.
Gigault Julien et al: "Accurate determination of the size distribution for polydisperse, cationic metallic nanomaterials by asymmetric-flow field flow fractionation", Journal of Nanoparticle Research, Kluwer Academic Publishers, Dordrecht, NL, vol. 16, No. 11, Nov. 13, 2014 (Nov. 13, 2014), pp. 1-10.
Kukura et al., "High-speed nanoscopic tracking of the position and orientation of a single virus", Nature Methods 2009 6:923-935.
Ortega-Arroyo et al. "Interferometric scattering microscopy (iSCAT): new frontiers in ultrafast and ultrasensitive optical microscopy", Physical Chemistry Chemical Physics 2012 14:15625-15636.
Cole et al., "Label-Free Single-Molecule Imaging with Numerical-Aperture-Shaped Interferometric Scattering Microscopy", ACS Photonics 2017, 4, 2, 211-216.
Brown et al., "Electrochemical Tuning of the Dielectric Function of Au Nanoparticles", ACS Photonics 2015, 2, 4, 459-464, Mar. 10, 2015.
Byers et al., "From tunable core-shell nanoparticles to plasmonic drawbridges: Active control of nanoparticle optical properties", Sci Adv. Dec. 4, 2015;1(11).
Brasiliense et al., "Electrochemistry of Single Nanodomains Revealed by Three-Dimensional Holographic Microscopy", Acc. Chem. Res. 2016, 49, 9, 2049-2057 Sep. 6, 2016.
Fang et al,. "Plasmonic Imaging of Electrochemical Reactions of Single Nanoparticles", Acc. Chem. Res., 2016, 49(11), pp. 2614-2624 DOI: 10.1021/acs.accounts.6b00348.
Namink et., "Optical Imaging of the Electric Double Layer Around Nanostructures", Phys. Rev. Applied 13, 044065—Published Apr. 24, 2020.

* cited by examiner

SCATTERING MICROSCOPY

CROSS-REFERENCE TO RELATED APPLICATIONS

This application is the National Stage of International Application No. PCT/GB2020/050625, filed Mar. 12, 2020, which claims priority to GB 1903891.8, filed Mar. 21, 2019, which are entirely incorporated herein by reference.

FIELD OF THE INVENTION

The present invention relates to scattering microscopy.

BACKGROUND

Several types of scattering microscopy are known in which an object is illuminated with illuminating light and light elastically scattered from the object is detected with a light detector. Examples of scattering microscopy include (a) interferometric scattering microscopy (iSCAT), for example as disclosed in: Kukura et al., "High-speed nanoscopic tracking of the position and orientation of a single virus", Nature Methods 2009 6:923-935; Ortega-Arroyo et al. "Interferometric scattering microscopy (iSCAT): new frontiers in ultrafast and ultrasensitive optical microscopy", Physical Chemistry Chemical Physics 2012 14:15625-15636; and Cole et al., "Label-Free Single-Molecule Imaging with Numerical-Aperture-Shaped Interferometric Scattering Microscopy", ACS Photonics 2017, 4, 2, 211-216 and (b) dark field scattering microscopy, for example as disclosed in the review article Jing et al., "Nanoscale electrochemistry in the "dark-field", Current Opinion in Electrochemistry, Vol. 6, Issue 1, December 2017, pp 10-16.

SUMMARY OF THE DISCLOSURE

The present invention is concerned with an improvement to the known techniques. According to a first aspect of the present invention, there is provided a method of performing scattering microscopy, the method comprising imaging an object comprising a surface with a scattering microscope including a light source arranged to emit illuminating light and a light detector, the microscope being arranged to illuminate an object with the illuminating light and to detect with the light detector light elastically scattered from the object, the method further comprising applying an electric potential to the surface that affects the electrochemical properties of the object while imaging the object, the object being selected not to have a plasmon resonance frequency at the wavelengths of the illuminating light and at the applied electric potential.

By applying an electric potential to the surface it is possible to affect the electrochemical properties of the object in a manner that provides advantages while performing scattering microscopy of the object. The change in the electrochemical properties affects the scattering contrast of the object. Herein, this is referred to as potentiodynamic contrast. This provides a contrast mechanism that allows features of the object to be imaged more clearly, and/or provides for characterisation of the object. For example, the potentiodynamic contrast is sufficient to visualise the electrochemical state of particles on the surface. Similarly, as the change in the electrochemical properties is dependent on the local topography and material composition, the potentiodynamic contrast is also useful to identify surface features and/or particles that are deeply sub-wavelength scatterers which are otherwise unrecognizable from the background speckle. In addition, the electrochemical state of the object and/or the environment around the object may be characterised. Similarly, rate of binding of particles to the surface can be controlled and monitored.

The surface may be a surface at which an electric double layer (EDL) forms, in which case the electric potential applied to the surface may affect the electrochemical properties of the electric double layer, for example by causing restructuring thereof. By changing the surface potential, the configuration (physical structure and/or composition) of the EDL changes. That is, change of the surface potential changes the chemical activity of the surface and hence the interaction between the object and constituents in the surrounding environment, for example molecules or ions. This results in a change in the amount of elastically scattered light.

The object does not have a plasmon resonance frequency at the wavelengths of the illuminating light and at the applied electric potential. The wavelength of the illuminating light is not a plasmon frequency of the object. Thus, the method uses a significantly different working principle from microscopy using plasmons, for example plasmonic nanoparticles or surface plasmons, wherein resonance of plasmons created in the object are used to provide a signal for imaging of the object. In contrast, the present method provides imaging using change in the electrochemical properties to provide potentiodynamic contrast. Indeed, as the object does not to have a plasmon resonance, the types of object and properties which may be studied are increased.

The present method also provides advantages over other analysis and microscopy techniques, for example as follows.

Relative to single-particle electrochemistry, the present method provides the power of interferometric scattering microscopy for identifying biomolecules that are too small to detect with other optical methods.

Relative to cyclic voltammetry, the present method allows potentiodynamic measurement on a single (nanoscopic) entity (instead of an ensemble or extended surface). This capability reduces all the down sides of surface inhomogeneity and allows simultaneous measurement on multiple adjacent locations on the surface.

Relative to conductive atomic force microscopy, the present method allows parallel (imaging) measurements on objects on the surface and is less invasive.

In one example, the surface may be a surface of a conductive material. In this example, the electric potential may be applied to the surface by applying the potential to the conductive material. Typically, the conductive material is not a metal which may avoid a plasmon resonance frequency at the wavelengths of the illuminating light.

In another example, the surface is a surface of a dielectric material. In this example, the electric potential may be applied to the surface by applying the potential capacitively through the dielectric material.

In one type of experiment, the surface itself may be imaged without the object comprising anything else. In this case, variation in surface properties, such as roughness and/or chemical composition, may be studied.

In another type of experiment, the object may further comprise at least one particle on the surface. The potentiodynamic contrast caused by restructuring of the EDL by the applied electric potential improves the contrast of the particle against the surface and is sufficient to visualise the electrochemical state of particles on the surface, allowing long-duration continuous measurement of the particles on the surface. $\lambda_S$ the particle has a different potentiodynamic response from the surface, the location of the particle can be identified and continuously monitored with sub-wavelength accuracy. Similarly, the electrochemical state of the particle and/or the electrochemical state of the environment around the particle can be characterised and monitored.

The electric potential may have an amplitude that is constant over a response period of the electrochemical properties of the object that are affected thereby.

Alternatively, the electric potential may have an amplitude that changes, for example alternating, over a period less than the response period of the electrochemical properties of the object that are affected thereby.

Plural different electric potentials may be applied to the surface. In this case, detection of the light elastically scattered from a part of the object in respect of each electric potential allows characterisation of that part of the object and/or the surrounding environment, for example by determining the degree of similarity of the profile of the light elastically scattered from the part of the object in respect of each electric potential with a reference profile. Typically, the potentiodynamic response of the contrast (change of contrast as a function of applied potential and its hysteresis) is non-linear, which can be used to characterise the object (for example the surface or an object on the surface) and/or the surrounding environment.

The method may be applied to any microscope arranged so that the signal detected by the light detector is sensitive to the amplitude of the light elastically scattered from the object, for example a total internal reflection scattering microscope, an interferometric scattering microscope or a dark field scattering microscope.

The microscope may output a two-dimensional image of the object.

The light may be ultraviolet light, visible light, or infrared light.

According to a second aspect of the present invention, there is provided a microscopy arrangement comprising: an object comprising a surface; a microscope including a light source arranged to emit illuminating light and a light detector, the microscope being arranged to illuminate the object with the illuminating light and to detect with the light detector light elastically scattered from the object, wherein the object is selected not to have a plasmon resonance frequency at the wavelengths of the illuminating light; and a voltage source arranged to apply an electric potential to the surface that affects the electrochemical properties of the object.

This microscopy arrangement operates in accordance with the method and provides similar advantages.

BRIEF DESCRIPTION OF THE DRAWINGS

To allow better understanding, an embodiment of the present invention will now be described by way of non-limitative example with reference to the accompanying drawings, in which.

DETAILED DISCLOSURE

Figure 1:
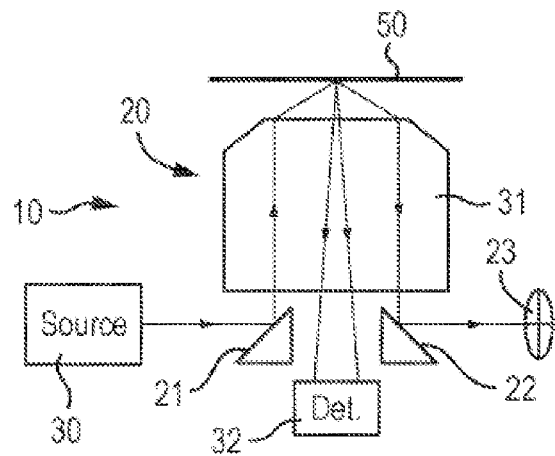
FIG. 1 is a diagram of a total internal reflection scattering microscope.
Figure 2:
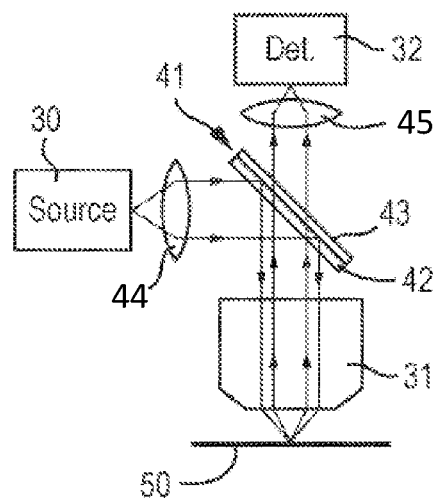
FIG. 2 is a diagram of an interferometric scattering microscope.

FIG. 1 shows a first microscopy arrangement 10 including a total internal reflection (TIR) scattering microscope 20 and FIG. 2 shows a second microscopy arrangement 20 including an interferometric scattering (iSCAT) miscroscope 40, which are examples of microscopy arrangements to which the present techniques may be applied. The first and second microscopy arrangements 10 and 20 each further include an object 50 which is the same in both cases and is described further below.

The iSCAT microscope may additional comprise a spatial filter positioned to filter the output light, the spatial filter being arranged to pass output light but with a reduction in intensity that is greater within a predetermined numerical aperture than at larger numerical apertures. The majority of light scattered from nanoscopic objects is scattered at high numerical apertures, and thus that the intensity of low NA light can be reduced without reducing the intensity of the scattered light from the nanoscopic object. By reducing the intensity of the reflected light, but leaving the scattered light relatively unattenuated there is an enhanced contrast and sensitivity and thus a better image.

The TIR scattering microscope 20 and the iSCAT microscope 40 are each used to image the object 50 and include in common a light source 30, an objective lens 31 and a light detector 32. In each case, the light source 30 emits illuminating light and the light detector 32 detects the light elastically scattered from the object 50.

In general, in all the techniques described herein the illuminating light may be any of visible light (in a range of wavelengths from 400 nm to 700 nm), ultraviolet light (in a range of wavelengths below 400 nm to a lower limit of 10 nm), or infrared light (in a range of wavelengths above 700 nm to an upper limit of 1 mm).

The TIR scattering microscope 20 and the iSCAT microscope 40 may operate in a wide-field mode, in which case the light detector 32 may be an image sensor that captures a two-dimensional image of the object 50, for example a CMOS (complementary metal-oxide semiconductor) image sensor. Conversely, the TIR scattering microscope 20 and the iSCAT microscope 40 could be adapted to operate in a confocal mode, in which case the light detector 32 could be a simple photodiode. In this case, a two-dimensional image of the object 50 may be obtained by scanning the object 50.

The TIR scattering microscope 20 and the iSCAT microscope 40 are each arranged to illuminate the object 50 with the illuminating light and to direct the elastically scattered light to the light detector 32.

The TIR scattering microscope 20 and the iSCAT microscope 40 are each configured so that the signal detected by the light detector 32 is sensitive to the amplitude of the light elastically scattered from the object 50 but have different configurations to achieve this, as follows.

The TIR scattering microscope 20 shown in FIG. 1 is a type of dark field scattering microscope arranged as follows.

In this case, the light source 30 emits illuminating light perpendicular to the optical axis O of the objective lens 31. A first reflective surface 21 deflects the illuminating light from the light source 30 through the objective lens 31 parallel to the optical axis O, but offset therefrom. Thus, the objective lens directs the illuminating light onto the object 50 at an angle of incidence greater than the critical axis, so that the light is reflected from the object 50 by TIR at a corresponding angle of reflectance.

The reflected light passes back through objective lens 50 and is emitted parallel to the optical axis O, but offset therefrom. $\lambda_S$ such, the illuminating light and the reflected light do not pass through the objective lens 31 along the optical axis O.

A second reflective surface 22 deflects the reflected light perpendicularly away from the optical axis O onto a quadrant photodiode (QPD) 23 which is used as a position sensitive device (PSD) for focus stabilisation.

In the TIR scattering microscope 20, the light detector 32 is aligned along the optical axis O. $\lambda_S$ a result, the light detector 32 receives the light elastically scattered from the object 50, but not the reflected light that does not pass through the objective lens 31 along the optical axis O. Accordingly, the configuration of the TIR scattering microscope 20 causes the light detector 32 detect light elastically scattered from the object 50 in a dark field mode with a signal that is sensitive to the amplitude of the elastically scattered light.

While the TIR scattering microscope 20 is described as an example of a dark field scattering microscope, the techniques described herein could be performed with any dark field scattering microscope, for example as disclosed in the review article Jing et al., "Nanoscale electrochemistry in the "dark-field", Current Opinion in Electrochemistry, Vol. 6, Issue 1, December 2017, pp. 10-16.

The iSCAT microscope 40 shown in FIG. 2 is arranged as follows.

In this case, the light source 30 is a coherent source such as a laser that emits illuminating light perpendicular to the optical axis O of the objective lens 31 onto a beam splitter 41. In this example, the beam splitter 41 is a plate 42 provided with a reflective film 43, which may be metallic or dielectric, arranged at 45° to the optical axis O, although the beam splitter 41 could have other forms such as a cube beam splitter formed by a matched pair of prisms having a partially reflective film at the interface therebetween.

A condenser lens 44 is provided between the light source 30 and the beam splitter 41 for condensing the illuminating light.

The beam splitter 41 is arranged to deflect the illuminating light into the objective lens 31 along the optical axis O. The objective lens 31 then focusses the illuminating light onto the object 50.

The objective lens 31 also collects the output light from the object and directs it through the beam splitter 41 to the light detector 32 through a tube lens 45, and optionally a pair of telescope lenses (not shown), that focuses the output light onto the light detector 32. The output light comprises both (a) light reflected from the object 50 and (b) light elastically scattered from object 50. $\lambda_S$ a result, the elastically scattered light constructively interferes with the reflected light, and so the signal detected by the light detector 32 is sensitive to the amplitude of the light elastically scattered from the object 50.

While the iSCAT microscope 40 is described as an example, the techniques described herein could be performed with any iSCAT microscope, for example as disclosed in: Kukura et al., "High-speed nanoscopic tracking of the position and orientation of a single virus", Nature Methods 2009 6:923-935; Ortega-Arroyo et al. "Interferometric scattering microscopy (iSCAT): new frontiers in ultrafast and ultrasensitive optical microscopy", Physical Chemistry Chemical Physics 2012 14:15625-15636; or Cole et al., "Label-Free Single-Molecule Imaging with Numerical-Aperture-Shaped Interferometric Scattering Microscopy", ACS Photonics 2017, 4, 2, 211-216 The TIR scattering microscope 20 and the iSCAT microscope 40 are given as examples, but the techniques described herein could be carried out with other form of scattering microscope.

Figure 3:
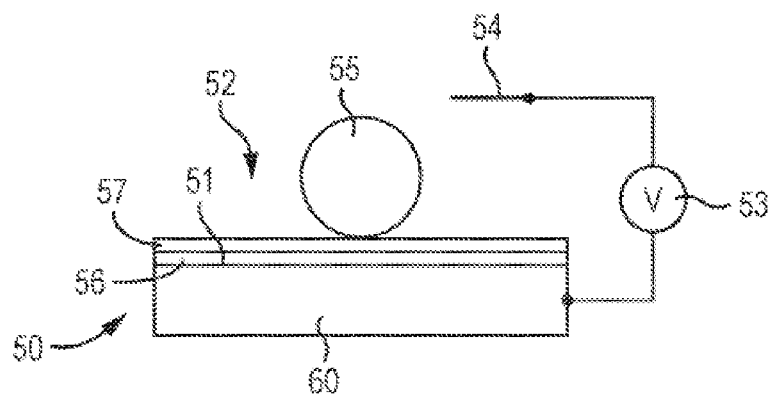
FIG. 3 is a schematic diagram of a first type of object.
Figure 4:
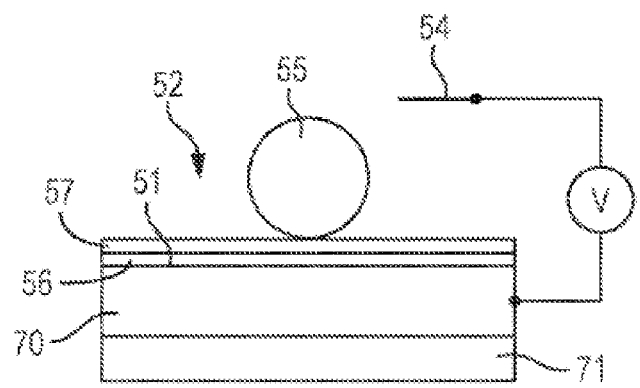
FIG. 4 is a schematic diagram of a second type of object.

The object 50 will now be described. Two alternative forms of the object 50 are shown in FIGS. 3 and 4. In all cases, the object 50 comprises a surface 51 to which an electric potential is to be applied. The potential is applied by a voltage source 53 which is also connected to a counter electrode 54.

A fluid 52 may be provided in the environment around the surface 51. The fluid 52 may be a solution, that may be an aqueous solution. The fluid 52 may include dissolved ions.

In the form shown in FIG. 3, the object 50 comprises a conductive layer 60 made of a conductive material, and the surface 51 is a surface of that conductive layer 60.

In this case, the electric potential is applied to the conductive layer 60 to which the voltage source 53 is connected, and so applied directly to the surface 51. The conductive material of the conductive layer 60 may be any suitable material, for example Indium Tin Oxide (ITO). The conductive layer 60 can be made of any material commonly used for optical imaging in particular gold, graphene, ITO, silver, platinum and graphene oxide. Ideally, the conductive material of the conductive layer 60 is not a metal to avoid the formation of plasmons, as discussed below. The conductive layer is configured such that its plasmon frequency is not the wavelength of the illuminating light. This could be through the material selection or by the particular geometry. Alternatively the illuminating frequency is selected such that it is not a plasmon frequency of either the object 50 or the conductive layer.

In the form shown in FIG. 4, the object 50 comprises a dielectric layer 70 of a dielectric material, and the surface 51 is a surface of that dielectric layer 70. The dielectric layer 70 is disposed on an electrode layer 71 made of a conductive material. The conductive material of the electrode layer 71 may be any suitable material, for example Indium Tin Oxide (ITO). Ideally, the conductive material of the electrode layer 71 is not a metal to avoid the formation of plasmons, as discussed below.

In this case, the electric potential is applied to the electrode layer 71 to which the voltage source 53 is connected, and so applied capacitively to the surface 51.

FIGS. 3 and 4 show examples of the object 50, but more generally, the techniques disclosed herein may be applied with the object 50 taking any form including a surface 51 to which an electric potential may be applied. Some other examples are as follows.

The surface 51 may be the surface of a material that is a solid, a liquid or a gas.

In one type of object 50, the surface 51 may be surface of layer of material. The material may be a solid, a liquid or a gas.

In another type of object 50, the surface 51 may be a surface of a structure shaped in three dimensions. In one example, the structure may be a liquid droplet, in which case the surface may be a surface of the liquid or a surface of a surfactant around the liquid. In another example, the structure may be a gas bubble, in which case the surface may be a surface of the gas or a surface of a surfactant around the gas.

The counter electrode 54 is shown schematically in FIGS. 3 and 4, but could take any suitable form, for example being a separate element disposed adjacent the object 50 or being integrated into a structure on which the surface 51 is formed.

The object 50 may further comprise at least one particle 55 on the surface 51, for example as illustrated schematically in FIGS. 3 and 4. The presence of a particle 55 as part of the object 50 together with the surface 51 is not essential, as the present techniques may equally be applied to the surface 51 alone, for example to image or characterise the surface 50, or to characterise the surrounding environment.

The particle 55 typically has a different scattering effect from the surface 51, there by providing contrast between the particle 55 and the surface 51, allowing the particle 55 to be identified in a two-dimensional image. Furthermore, as discussed in more detail below, the application of an electric potential provides a potentiodynamic contrast that increases the contrast between the particle 55 and the surface 51. $\lambda_S$ also discussed below, application of an electric potential also allows the particle 55 to be characterised by study of the signal from the particle 55.

The particle 55 may in general be any type of particle that has a scattering cross-section with respect to the illuminating light. Some non-limitative examples are as follows.

The particle 55 may be a dielectric particle.

The particle 55 may be a protein or an aggregate of proteins.

The particle 55 may be a metal particle.

The particle 55 may be a nucleic acid molecule, such as an RNA (ribonucleic acid) or DNA (deoxyribonucleic acid), or an artificial nucleic acid molecule, or any aggregate thereof.

The particle 55 may be a polypeptide, a glycopolypeptide or glycoprotein, a lipopolypeptide or lipoprotein or any aggregate thereof.

The particle 55 may be a lipid, a proteoglycan, or a sugar polymer.

The particle 55 may be any biopolymer.

The particle 55 may be an aggregate of different particles listed herein, for example an aggregate of a protein and a nucleic acid, an aggregate of a glycoprotein (for example an antibody) and a protein or polypeptide.

The particle 55 may be naturally derived, artificial or a hybrid of natural and artificial.

The particle 55 may be an inorganic particle or an inorganic aggregate. Such particles are not consisting of or deriving from living matter.

The particle 55 may be any nanomaterial, particularly engineered nanomaterials.

The particle 55 may be a charged particle, since many biopolymers are naturally charged. Natural nucleic acids for example are highly charged due to the phosphate backbone.

Typically, the particle 55 may have a scattering cross section with respect to the illuminating light of $10^{-17}$ m$^2$ or less, and/or have a scattering cross section with respect to the illuminating light of $10^{-26}$ m$^2$ or more. Scattering cross section is a fundamental, measurable property relating to the effective size of an object to incident light of a particular wavelength, independent of the technique used to measure it. Scattering cross sections can be, for example, measured by dark field microscopy.

The particle 55 may have a mass of 10 kDa or more.

In some applications, the particle 55 may have a mass of 5000 kDa or less. Typically, the present invention may be applied to a particle 55 having a mass of 10 kDa or more, for example objects having a mass within a range from 10 kDa to 5000 kDa. However, the particle 55 may be larger and may in general be any particle (or part of a particle) that fits within the field of view. These larger particles may be composed of linear biopolymers of the type discussed above. Examples of relatively large particles that may have mass of more than 5000 kDa include fibrils, fibres or cylinders. Larger particles may be biologically derived, for example a fibril is a structural biological material found in nearly all living organisms. Exemplary larger particles that may include fibrils include collagen, actin, myosin, elastin, keratin, resilin, spider or insect silk, cellulose, amylose or wood. A fibre may be described as a thread or filament from which a vegetable tissue, mineral substance, or textile is formed. A fibre is also a structure forming part of the muscular, nervous, connective, or other tissue in the human or animal body. Other types of exemplary biological or artificial larger particles include protein filaments, protein cages, protein aggregates and protein channels, such as membrane channels. Large nucleic acid origami structures may also be considered to be a larger particle. Alternatively or additionally, the large particle may be inorganic, such as carbon based nanoparticles (for example, rods, tubes, spheres, fullerenes). Similarly, the object 50 may comprise a chain of particles. Thus, the term "particle" does not imply any particular shape such as spherical, and may refer to any entity that is on the surface 51.

The potentiodynamic contrast provided by change in the electrochemical properties of the object 50 under the applied electric potential will now be described.

The electric potential applied to the surface 51 affects the electrochemical properties of the object. In a main example, the surface 51 is a surface at which an electric double layer (EDL) forms. In that case, the electric potential applied to the surface 51 affects the electrochemical properties of the EDL.

The EDL formed around the charged surface of nanostructures inside a liquid influences their optical scattering strength. The formation of the EDL is a central element in virtually all the electrokinetic processes. For example, a description of energy storage in batteries, salvation of molecules, the filtration process in membranes, and most of the transport in liquid environments requires consideration of the EDL.

The EDL comprises first and second layers 56 and 57 of charge that form on the surface 51, for example as shown schematically in FIGS. 3 and 4. The first layer 56 is formed directly on the surface and comprises ions adsorbed onto the surface 51 due to chemical interactions. The first layer 56 provides a surface charge that may be positive or negative. The second layer 57 is formed on the first layer 56 and comprises ions attracted to the surface charge of the first layer 56 via the Coulomb force. Thus, the second layer 57 electrically screens the first layer 56. However, the second layer 57 is more loosely associated with the surface 51 than the first layer 56, because the Coulomb force is weaker than the chemical interactions holding the first layer 56. The ions of the second layer 57 are free ions that move in the fluid 52 adjacent the surface 51 under the influence of the electrical attraction of the first layer 56 and thermal excitation and is sometimes referred to as "the diffuse layer".

The thickness of the EDL generally varies between one nanometer and a few tens of nanometer, dependent on the ionic strength of the adjacent fluid 52.

The formation of the EDL involves several time scales, the fastest of which is the molecular diffusion timescale, $D/\lambda_D^2$ where D is the diffusion constant and $\lambda_D$ is the Debye length with is a measure of the thickness of the EDL. The small volume and fast timescales involved in formation of the EDL makes direct access to its local dynamics an experimental challenge. Much observation in this area has been obtained by measuring the local electric current at high frequencies using scanning probe methods or ultramicroelectrodes.

The application of an electric potential affects the electrochemical properties of the object 50 by causing a change in the configuration of the EDL. In particular the physical structure and/or composition of the EDL may change. Such changes of configuration of the EDL results in a change of the scattering signal which is detected. That is, change of the surface potential changes the chemical activity of the surface and hence the interaction between the object and constituents in the surrounding environment, for example molecules or ions. This results in a change in the amount of elastically scattered light, and so affects the scattering contrast of the object, which is referred to herein as potentiodynamic contrast. This provides a contrast mechanism for the microscopy which may be utilised in a number of ways.

Indeed, visualizing the optical contrast of the EDL provides direct access to wide field measurements for studying spatial transport and combining the power of optical microscopy with electrochemical analytics. While the change in light reflection from a surface due to formation of the EDL has been over many decades, its influence on elastic light scattering from nanoparticles is very small.

In some applications, the potentiodynamic contrast is used as a contrast mechanism that allows features of the object to be imaged more clearly, for example to image surface features of the surface 51 itself, for example structural features and/or features of chemical composition, and/or any particle 55 that may be present. Similarly, as the change in the electrochemical properties is dependent on the local topography and material composition, the potentiodynamic contrast is also useful to identify surface features and/or particles that are deeply sub-wavelength scatterers which are otherwise unrecognisable from the background speckle.

Principles of potentiodynamic contrast are considered as follows.

First, an estimate of the expected potentiodynamic contrast is derived as a function of the surface potential of a conducting nanosphere. Because we are mainly interested in the EDL, here the changes due to reconfiguration of ions outside the particle are considered. Change of the polarizability due to injection of charges inside the particle can also occur as has been observed previously in plasmonic nanoparticle, but are expected to be much less influencing the dielectric particles and semiconductors such as ITO. The optical contrast of EDL can be used to study particles that are dielectric or particles that are metallic scatterers with plasmon resonance frequencies far from the frequency of the illuminating light.

A very simplified model of the EDL assumes the screening ions with opposite charge to the particle surface are uniformly distributed in a layer of thickness $\lambda_S \ll a$, where a is the nanosphere radius. This model is a good match for the physical conditions for surface potentials much larger than the characteristic potential $k_BT/e \approx 25$ mV (where $k_B$ is the Boltzmann constant, T is the temperature and e is the electrical charge of an electron) in which charge screening is mostly due to the Stern layer. Considering a more realistic model of the EDL that includes also the diffuse layer does not change that scaling behaviour of the optical contrast and hence unnecessary for the current estimation.

The total number of excess counter ions N necessary for screening the nanosphere at potential V is given by $Vea/k_BT \lambda_B$, where B is the Bjerrum length. In the Rayleigh scattering regime, the polarizability of the combined system of nanosphere and the EDL is a volumetric sum of its constituents. Using the Rayleigh polarizability and the phenomenological relation between refractive index and salt concentration $n_{mix}=n_{solvent}+K_{x_S}$, where $x_S$ is the ratio between number density of salt ions and solvent molecules, the final scaling result for the ratio of the scattering αEDL of the EDL to the scattering of the particle $\alpha_P$ is given by:

$$\alpha EDL/\alpha_P = C(Ve/k_BT)/(4\pi a^2 \lambda_B \rho_w)$$

where $\rho_w$ is the number density of water molecules (considering an aqueous solution) and C is the prefactor. For a typical dielectric material and a alkali-halogen salt, the prefactor C is in the order of unity.

Using $\rho_w=55$ nm$^{-3}$ and $\lambda_B=0.7$ nm for water, gives $\alpha_{EDL}/\alpha_p=0.008$ for a 10 nm (diameter) titanium dioxide particle in NaCl salt solution at a surface potential of V=1 Volt. This small ratio hints that such a change could only be measured with interferometric methods.

This result shows the presence of a contrast mechanism that increases with the applied potential V and with decreasing size of particle (i.e. inversely with the square of the nanosphere radius).

Repeating a similar estimation for a cylinder of radius r results in $$\alpha EDL/\alpha_P = C(Ve/k_BT)/(4\pi r \lambda_S \lambda_B \rho_w)$$

where $\lambda_S$ is a characteristic thickness of the EDL where charge neutralisation occurs. This result also shows the presence of a contrast mechanism that increases with the applied potential V and with decreasing size of cylinder (i.e. inversely with the square of the nanosphere radius). It also shows that potentiodynamic contrast may be easier to observe for ridges than for nanoparticles on the surface.

Although these results relate specifically to a sphere and a cylinder, potentiodynamic contrast is similarly provided by curved features of the surface 51 or by a particle 55 of any shape on the surface 51. This provides for direct visualization of such curved features or particles 55. Thus, the present techniques may be applied to provide wide-field imaging of an object comprising a surface 51 and optionally also a particle 55. This allows the electrochemical properties of various systems to be studied.

While the above analysis demonstrates a contrast mechanism for structural features of the surface 51 and particles 55 on the surface 51, a contrast mechanism is similarly provided for variations in the chemical composition of the surface 51 which are affected by the applied electric potential.

Previously applied electric potentials have been used in plasmonic resonance microscopy, which involves surface plasmons or plasmonic particles, has been used for study of particles albeit with a limitation to surfaces and particles that have a plasmonic resonance accessible by the illuminating light. However, the present techniques use a significantly different working principle in which resonance of plasmons is not created. Instead, the present techniques use change in the electrochemical properties to provide potentiodynamic contrast as described above.

Thus, in all examples, the object 50 (including the surface 51 and the particle 55, if present) is selected not to have a plasmon resonance frequency at the wavelength of the illuminating light and at the applied electric potential. This prevents the plasmon resonance causing a signal that masks the desired signal from the elastically scattered light that is affected by the change in the electrochemical properties.

In other applications, the potentiodynamic contrast is used to provide characterisation of the object 50 and/or the environment around the object 50 The potentiodynamic contrast caused by restructuring of the EDL is sufficient to characterise the electrochemical state of the surface 51, which is affected by the surface 51 and its environment, and similarly sufficient to characterise the electrochemical state of a particle 55 on the surface 51. The present techniques provide direct access to dynamics of the EDL at timescales accessible to ultrafast as well as long duration optical measurements. Wide-field imaging of ion transport and other electrochemical activities across a surface may be monitored and used to provide feedback controlled creation of electrochemical microscopic landscapes.

By changing the electrochemical state of the surface 51, the rate of binding of particles 55 to the surface 51 can be controlled and monitored. By controlling the surface potential, the rate can be either decreased to avoid crowding of the measurement plane too quickly, or increased to speed up the measurement process. The chance in the adsorption rate as a function of surface potential is also an important signifier of the adsorbents' properties.

Different electrochemical properties may be studied, depending on the nature of the applied electric potential.

In some applications, the applied electric potential has an amplitude that is constant over a response period of the electrochemical properties of the object 50 that are affected thereby. This provides a signal that is dependent on the static electrochemical properties of the object 50.

In other applications, the applied electric potential has an amplitude that changes over a period less than the response period of the electrochemical properties of the object 50 that are affected thereby. For example, the amplitude of the applied electric potential may have an amplitude that is alternating over a period less than the response period of the electrochemical properties of the object that are affected thereby, or may have an amplitude that undergoes a step-change. This provides a signal that is dependent on the dynamic electrochemical properties of the object 50.

The electrochemical properties at different potentials may be studied.

For example, plural different electric potentials may be applied to the surface. In that case, the light elastically scattered from a part of the object is detected in respect of each electric potential for characterisation of that part of the object and/or the surrounding environment. The degree of similarity of the profile of the light elastically scattered from a part of the object in respect of each electric potential may be compared with a reference profile.

Experimental results demonstrating potentiodynamic contrast were obtained as follows.

The object 50 was of the type shown in FIG. 3 and comprised a surface 51 of a conductive layer 60 of indium tin oxide (ITO) provided as a coating of thickness 50 nm on a glass slide and to which an the electric potential was applied.

Microscopy of the object 50 was performed using a TIR scattering microscope 20 of the type shown in FIG. 1. An area of size 50 µm square of the object 50 was illuminated through an objective lens 31 of an oil-immersion type having a numerical aperture of 1.45 The cross-interference term of scattering light from substrate surface and the nanoparticle is proportional to the change in the particle polarisability, and is used here to visualise the EDL reconfiguration. The background scattering signal is kept stable with variations much smaller than the potentiodynamic contrast, in the order of one percent. This constant level is achieved by paying special attention to the mechanical stability of the microscope and kHz-bandwidth stabilisation of the sample stage.

The counter electrode 54 was provided as another ITO slide kept at the distance of 100 µm or a floating Pt electrode. Use of a separate reference electrode such as Ag/AgCl was avoided to prevent contamination of the ITO surface with small nanoparticle depositions.

Except where otherwise specified, the electric potential was applied as a balanced triangular waveform while recording the scattering images.

Figure 5:
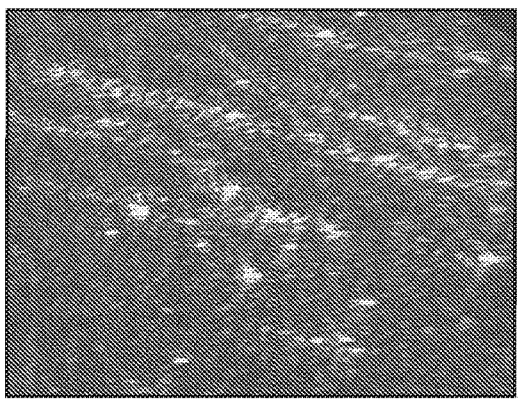
FIG. 5 is a scattering image of a surface of indium tin oxide (ITO)
Figure 6:
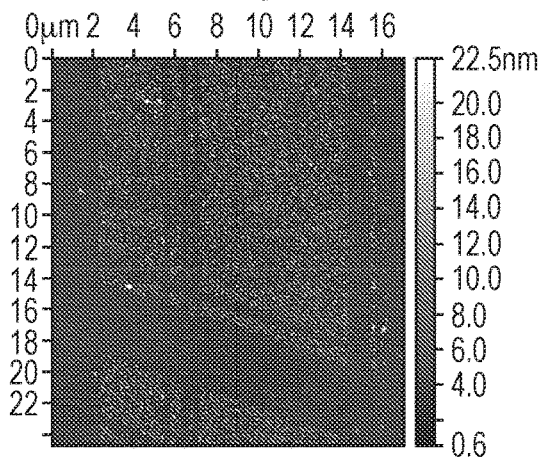
FIG. 6 is surface profile of ITO measured with atomic force microscopy (AFM)
Figure 9:
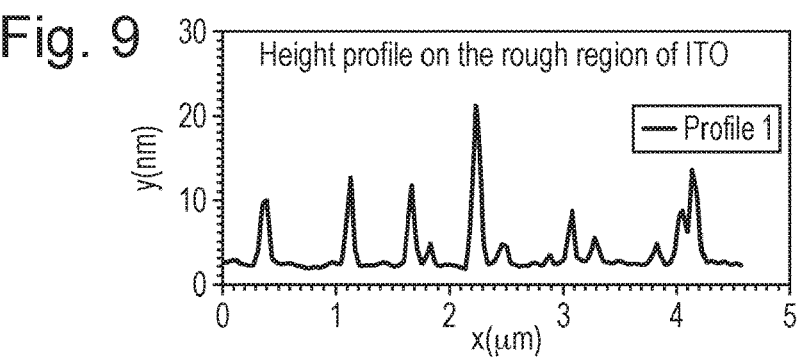
FIG. 9 is a surface profile measured with AFM along a line in FIG. 6.
Figure 10:
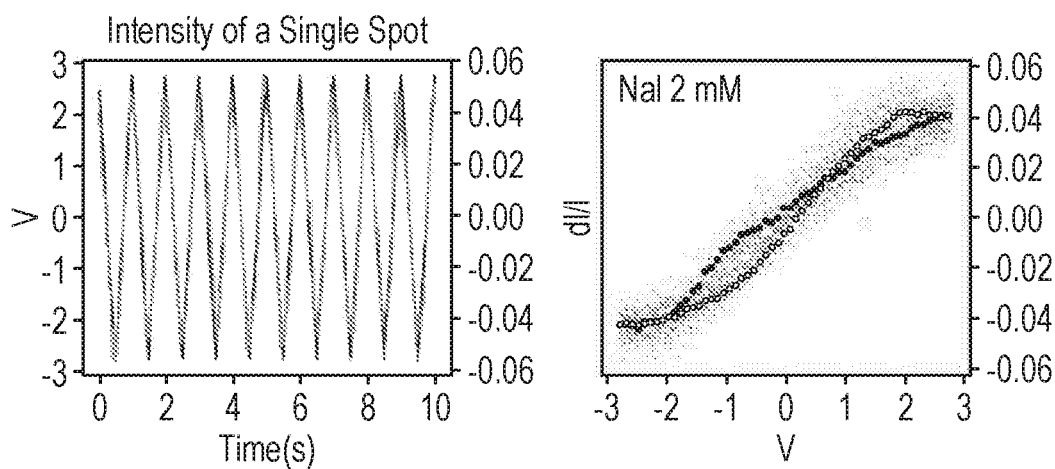
FIGS. 10 to 13 are each a temporal plot and a scatter plot of applied potential and the detected light elastically scattered from a surface of ITO at a single spot exposed to respectively different solutions, the temporal plots being plots of applied voltage V (volts) against time (s), and the scatter plots being plots of relative differential intensity dI/I against applied voltage (V)
Figure 11:
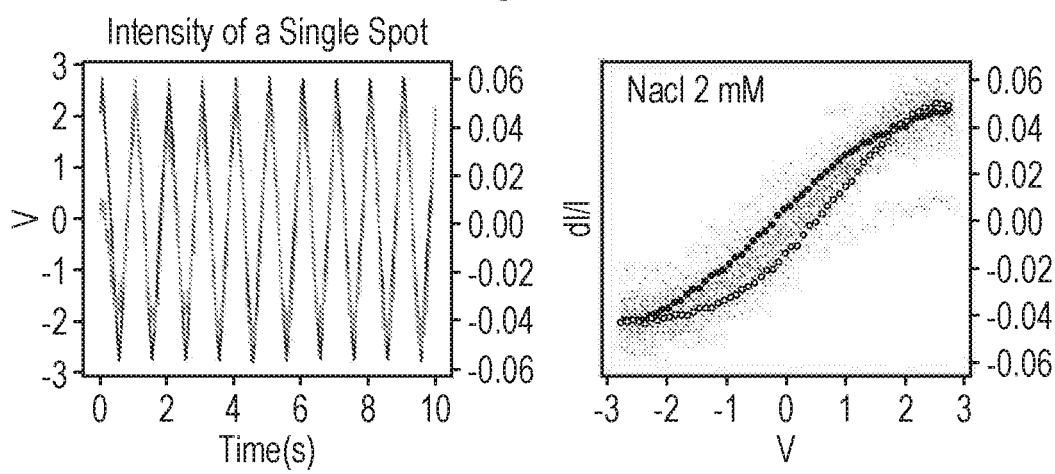
Figure 12:
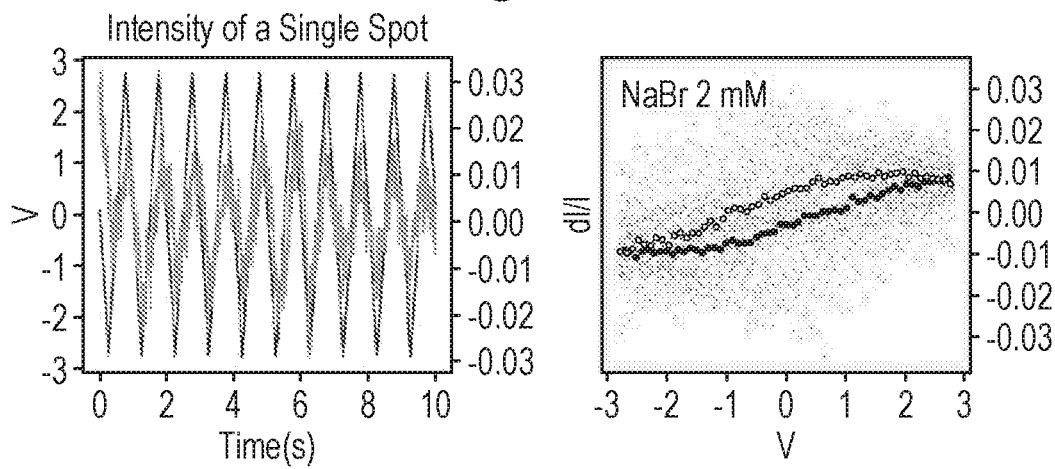
Figure 13:
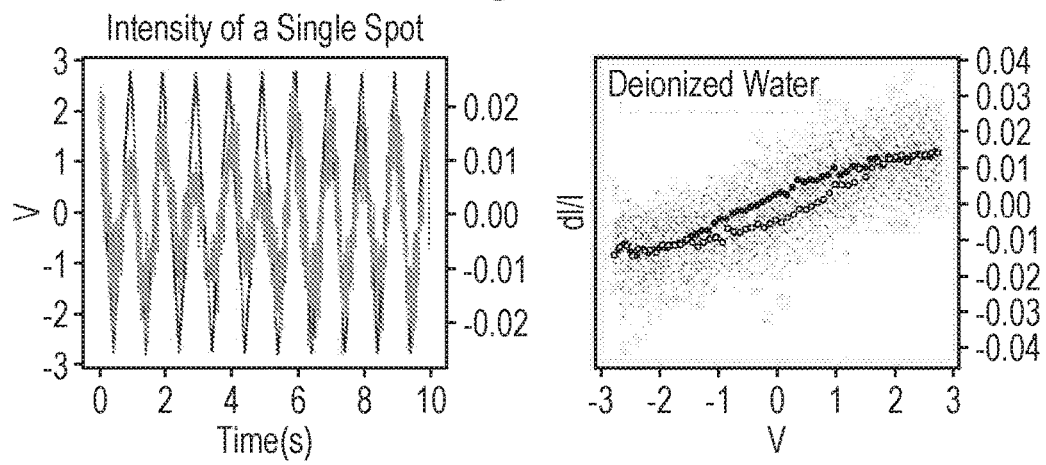

FIG. 5 is scattering image of the ITO showing that the ITO surface has regions of high scattering in form of a parallelogram, with sharp edges and corners, separated from comparatively smooth regions of 10-100 times lower scattering. Atomic force microscopy of the ITO surface as shown in FIGS. 6 and 9 allows detection of the presence of sparse grains of roughly 20 nm in these areas. The sharp boundaries confining these grains indicate to the crystallographic origin of their formation, perhaps related to the stoichiometric excess of tin or indiums, during the annealing treatment of ITO.

Figure 7:
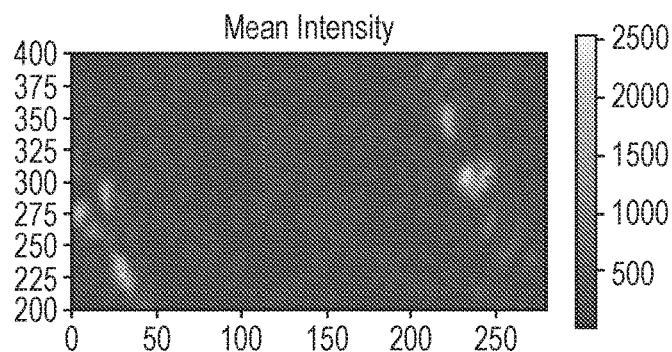
FIG. 7 is a magnified version of FIG. 5.

Scattering images were recorded while changing the potential of the ITO substrate relative to the counter electrode. By subtracting the average scattering signal of the whole cycle from each, the potentiodynamic contrast image is obtained, as shown in FIG. 7. First the bare ITO substrate is measured in a regions where both rough and smooth surfaces are visible. Because of the relatively homogeneous size distribution of the grains on ITO rough regions, we can use them as a reference for potentiodynamic contrast of other types of nanoparticles.

To demonstrate that the reconfiguration of EDL is the major contribution to measured potentiodynamic contrast, the same region of ITO for three different monovalent salts at the same concentration, and de-ionized water was investigated. The applied electric potential was changed slowly compared to the response period of the electrochemical properties of the surface 54. Thus, effectively, the applied electric potential was had an amplitude that was constant over that response period, but the elastically scattered light at different electric potentials was detected at the sampling rate of the light detector 32.

Figure 8:
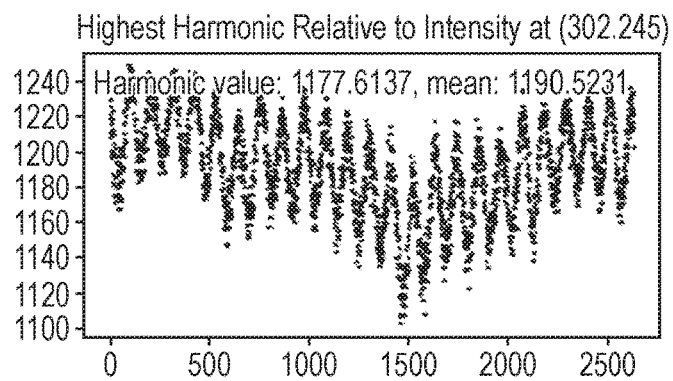
FIG. 8 is a graph of the scattering intensity of a single point where the applied electric potential changes with a with triangular waveform.

FIG. 8 shows how the scattering intensity of a single point changes in response to change of the applied electric potential with a with triangular waveform.

FIGS. 10 to 13 which show the applied potential and the detected light elastically scattered from the surface 51. The intensity variations of a single speckle versus the applied potential, averaged over tens of cycles are shown. This uses the potentiodynamic contrast to perform cyclic voltammetry at a local current level of 10-18 Amperes, corresponding to exchange of only a few elementary charges.

The results characterise the solution in the environment of the surface 51. For example, in the experimental conditions here the potentiodynamic contrast for 2 mM NaI and NaCl was four times higher than that of NaBr and DI water. Similarly, the profile of the elastically scattered light in respect of each applied electric potential varies for the different solutions.

Next, the change in the optical contrast of a single titania ($TiO_2$) particle of diameter 19 nm was studied. A suspension of the particle was inserted into the measurement cell while observing the titania particles landing on ITO surface. The excess of non-deposited particles where replace by a solution of 2 mM NaI.

Figure 14:
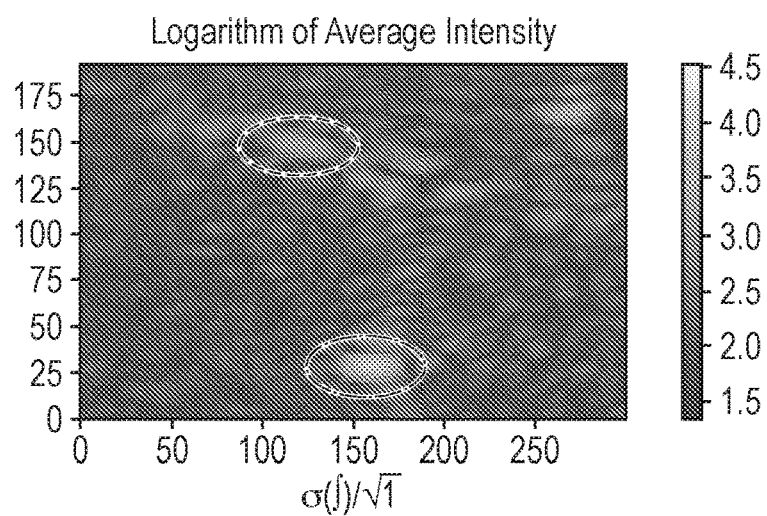
FIG. 14 is a scattering microscopy image of an $TiO_2$ particle on an ITO surface, plotting the logarithm of the average intensity.
Figure 15:
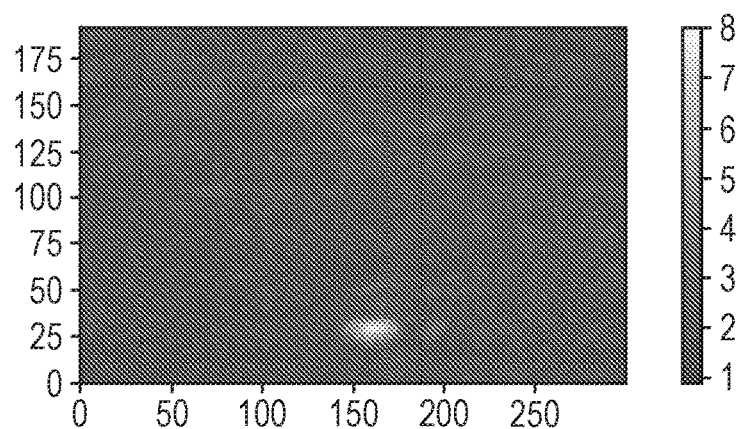
FIG. 15 is the image of FIG. 14 processed to show the potentiodynamic contrast.

FIG. 14 shows a scattering microscopy image of the $TiO_2$ particle. By comparison, FIG. 15 shows the potentiodynamic contrast, that is the amplitude of the intensity oscillations while applying the potential relative to the average for each pixel, e.g. the amplitude to average intensity of the measured signal in curves similar to FIG. 8.

The applied electric potential was changed slowly compared to the response period of the electrochemical properties of the surface 54. Thus, effectively, the applied electric potential was had an amplitude that was constant over that response period, but the elastically scattered light at different electric potentials was detected at the sampling rate of the light detector 32.

Figure 16:
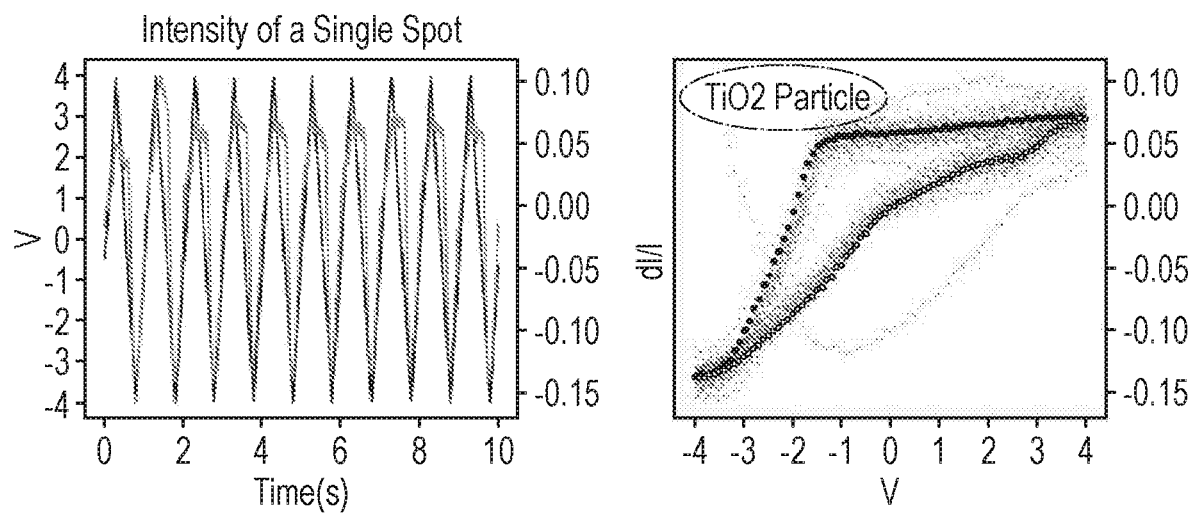
FIGS. 16 and 17 are each a temporal plot and a scatter plot of applied potential and the detected light elastically scattered respectively from the $TiO_2$ particle and the ITO surface.
Figure 17:
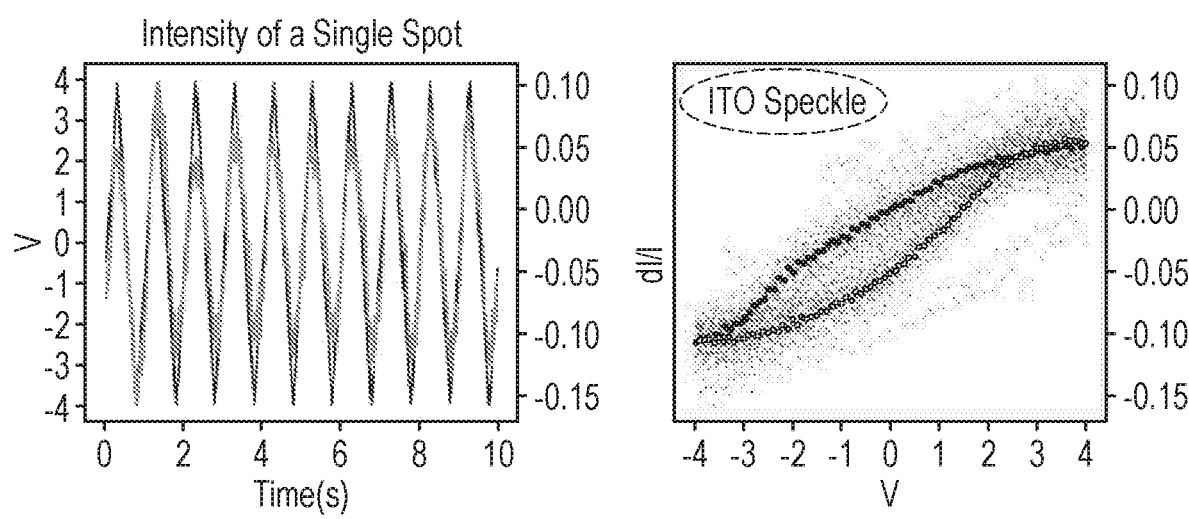

FIGS. 16 and 17 show the applied potential and the detected light elastically scattered from, respectively, the $TiO_2$ particle and a rough spot on the surface 51. This uses the potentiodynamic contrast to perform cyclic voltammetry on a single 19-nm titanium dioxide at a local current level of 10-18 Amperes, corresponding to exchange of only a few elementary charges. This comparison clearly shows the material specificity of potentiodynamic microscopy.

In summary, these results show experimental measurement of the reconfiguration of EDL directly from change in the optical contrast. Given that interferometric scattering has the sensitivity of probing singe biomolecules down to few tens of kD, measurement of the potentiodynamic contrast paves the ways to measuring the oxidation and reduction processes and other reactions on a single protein for an extended period of time.

At relatively low potentials compared to the electrochemical reaction potential and with using fully polarizable electrodes, potentiodynamic scattering contrast is mostly due to reconfiguration of the EDL. That is, elastic light scattering is influenced mostly by the physical adsorption of counterions that have a different optical polarisability (refractive index) than the solvent. The dependence of the potentiodynamic contrast on the type of salt is shown and allows for characterisation of the salt.

At higher potentials the potentiodynamic contrast from nanoparticles adsorbed shows a different pattern than the underlying ITO substrate due to their electrochemical activation. This difference is used to perform and optical equivalent of cyclic voltammetry on a single 19-nm titanium dioxide nanoparticle. The material and surface topography dependence of potentiodynamic contrast creates a previously untapped contrast mechanism for chemical specific optical microscopy of single macromolecules. Similarly for higher potentials that reactions such as water-splitting start, this contrast can be used to measure the formation of products.

The start of these processes can best be identified by the nonlinearity of the contrast signal with respect to applied potential. In this regime, potentiodynamic contrast microscopy can provide similar information to cyclic voltammetry, with the optical contrast indicating the displaced charge instead of the current measurement.

The present techniques have numerous applications, some non-limitative examples being as follows:

Selectively reject or attract particles with a surface charge by applying a potential. This enables different particles to be attracted to the surface and measured using, for example, mass photometry. Such ability may be particularly useful in objects that comprise mixed particles such as biological samples with proteins and nucleic acids;

Check for interaction bias with the measurement surface by measuring at neutral, negative and/or positive i.e. check that no additional species are attracted at potential;

Compare measurements at different potentials, for example a measurement at a particular potential with a measurement at neutral. Alternatively compare measurements at different potentials. Interactions with a surface at potential will compete with particle binding based on charge interactions;

Probe whether the potential can selectively dissociate interactions in bound complexes;

Monitoring of properties of single nanoscopic objects and their (electro)chemical state, e.g. oxidation/reduction of a single protein, progress of catalytic activities of a single particle, change of abundance of "invisible" ions around a "detected" biomolecule, or changes in the chemical state of a biomolecule;

Monitoring interaction of these objects with other molecules, e.g. binding/unbinding of other molecules, exchange of ions with nearby objects or surface, affinity to certain molecules in the solvent;

Identifying and monitoring surface inhomogeneity and particular defects or surface structures;

Studying nucleation, formation, and dissociation of compounds at the surface;

Adjusting the binding/unbinding rate of molecules in the solution to the surface for interferometric scattering mass spectrometry;

Performing interferometric scattering on conducting surface or surfaces with (continuously) tuneable surface potential;

Heterodyne measurement of reflectivity contrast;

Measuring nonlinear response of reflectivity contrast to change of the surface potential at the single particle level to infer material properties;

Performing optical contrast electrochemical measurements on dielectric objects (as opposed to previous works on metallic particles);

Detection of solvent properties and presence of reactive chemicals;

Investigating dynamics of mixed phases (gas bubbles, polymers) at the surface;

Monitoring dynamics of objects going through nanopores with optical scattering signal;

Basically most experiments done by cyclic-voltammetry on surfaces can now be done on single particles;

Measuring special variation of ion currents and ion concentrations on top of a surface, at the edges, or along ridges; and Measuring the temporal dynamics of all of the above.

The invention claimed is:

1. A method of performing scattering microscopy, the method comprising imaging an object comprising a surface with a scattering microscope including a light source arranged to emit illuminating light and a light detector, the microscope being arranged to illuminate the object with the illuminating light and to detect light elastically scattered from the object with the light detector, the method further comprising applying an electric potential to the surface that affects electrochemical properties of the object while imaging the object, the object being selected not to have a plasmon resonance frequency at wavelengths of the illuminating light and at the applied electric potential.

2. A method according to claim 1, wherein an electric double layer forms at the object and the electric potential to the surface affects the electrochemical properties of the electric double layer.

3. A method according to claim 1, wherein the surface is a surface of a dielectric material and the step of applying an electric potential to the surface comprises applying the electric potential capacitively through the dielectric material.

4. A method according to claim 1, wherein the electric potential has an amplitude that is constant over a response period of the electrochemical properties of the object that are affected thereby.

5. A method according to claim 1, wherein the method comprises applying plural different electric potentials to the surface, and detecting the light elastically scattered from a part of the object in respect of each electric potential for characterisation of that part of the object and/or a surrounding environment.

6. A method according to claim 1, wherein the microscope is arranged so that the detected signal by the light detector is sensitive to amplitude of the light elastically scattered from the object.

7. A method according to claim 1, wherein the microscope is an interferometric scattering microscope or a dark field scattering microscope.

8. A method according to claim 1, wherein the microscope is arranged to output a two-dimensional image of the object.

9. A method according to claim 1, wherein the light is ultraviolet light, visible light, or infrared light.

10. A method according to claim 1, wherein the surface is a surface of a conductive material and the step of applying an electric potential to the surface comprises applying the potential to the conductive material.

11. A method according to claim 10, wherein the conductive material is not a metal.

12. A method according to claim 1, wherein the electric potential has an amplitude that changes over a period less than the response period of the electrochemical properties of the object that are affected thereby.

13. A method according to claim 12, wherein the electric potential has an amplitude that is alternating over a period less than a response period of the electrochemical properties of the object that are affected thereby.

14. A method according to claim 1, wherein the object further comprises at least one particle on the surface.

15. A method according to claim 14, wherein the at least one particle has a mass of 5000 kDa or less.

16. A method according to claim 14, wherein the at least one particle has a mass of 10 kDa or more.

17. A method according to claim 15, wherein the at least one particle has a scattering cross section with respect to the illuminating light of $10^{-17}$ m$^2$ or less.

18. A method according to claim 15, wherein the at least one particle has a scattering cross section with respect to the illuminating light of $10^{-26}$ m$^2$ or more.

19. A scattering microscopy arrangement, the microscopy arrangement comprising:

an object comprising a surface;

a microscope including a light source arranged to emit illuminating light and a light detector, the microscope being arranged to illuminate the object with the illuminating light and to detect with the light detector light elastically scattered from the object; and a voltage source arranged to apply an electric potential to the surface that affects electrochemical properties of the object while imaging the object, the object being selected not to have a plasmon resonance frequency at wavelengths of the illuminating light and at the applied electric potential.

* * * * *